United States Patent
Yuen

(12) 
(10) Patent No.: US 11,784,793 B2
(45) Date of Patent: Oct. 10, 2023

(54) APPLICATIONS IN CONNECTION WITH SECURE ENCRYPTION

(71) Applicants: PERMANENT PRIVACY LTD., Tortola (VG); Arthur Yuen, Uxbridge (GB)

(72) Inventor: Pak Kay Yuen, Shatin (CN)

(73) Assignee: PERMANENT PRIVACY LTD., Tortola (VG)

(*) Notice: Subject to any disclaimer, the term of this patent is extended or adjusted under 35 U.S.C. 154(b) by 319 days.

(21) Appl. No.: 16/320,838

(22) PCT Filed: Jul. 29, 2016

(86) PCT No.: PCT/IB2016/001215
§ 371 (c)(1),
(2) Date: Jan. 25, 2019

(87) PCT Pub. No.: WO2018/020286
PCT Pub. Date: Feb. 1, 2018

(65) Prior Publication Data
US 2019/0165929 A1    May 30, 2019

(51) Int. Cl.
*H04L 9/06* (2006.01)
*G06F 9/54* (2006.01)
*H04L 9/08* (2006.01)

(52) U.S. Cl.
CPC ............. *H04L 9/065* (2013.01); *G06F 9/543* (2013.01); *H04L 9/0877* (2013.01); *H04L 2209/12* (2013.01); *H04L 2463/062* (2013.01)

(58) Field of Classification Search
CPC ... H04L 9/065; H04L 9/0877; H04L 63/0435; H04L 2209/60; H04L 63/0428;
(Continued)

(56) References Cited

U.S. PATENT DOCUMENTS 5,799,090 A * 8/1998 Angert ................. H04L 9/0662
380/278
5,905,505 A * 5/1999 Lesk ....................... G06F 21/84
345/630
(Continued)

FOREIGN PATENT DOCUMENTS

EP    2608100 A1    6/2013
JP    2002-9759    1/2002
(Continued)

OTHER PUBLICATIONS

International Search Report for PCT/IB2016/001215 dated Mar. 31, 2017.
(Continued)

*Primary Examiner* — David Garcia Cervetti
(74) *Attorney, Agent, or Firm* — STAAS & HALSEY LLP

(57) ABSTRACT

An encryption box device has a memory and a processor coupled to the memory. A first clipboard runs on the processor and downloads a plaintext stream. An encryption engine runs on the processor and receives the plaintext stream and encrypts the plaintext stream to produce an encrypted stream. A digitizer runs on the processor and digitizes the encrypted stream to produce a digitized encrypted stream. A second clipboard runs on the processor and uploads the digitized encrypted stream. The encryption engine may also decrypt the encrypted stream to produce the plaintext stream and upload the plaintext stream to the first clipboard.

22 Claims, 21 Drawing Sheets

(58) Field of Classification Search
CPC . H04L 63/0457; H04L 9/0656; H04L 9/0625; H04L 2463/062; H04L 63/0442; H04L 9/12; H04L 9/0662; H04L 9/0618; H04L 9/0643; H04L 9/14; H04L 9/0637; H04L 9/0631; H04L 2209/12; G06F 9/543; G06F 21/10; G06F 21/606; G06F 21/6209; G06F 21/602; G06F 2221/2107
See application file for complete search history.

(56) References Cited

U.S. PATENT DOCUMENTS

| | | | |
|---|---|---|---|
| 5,943,421 A | 8/1999 | Grabon | |
| 5,964,844 A * | 10/1999 | Rosenthal | G06F 9/451 719/310 |
| 6,023,506 A * | 2/2000 | Ote | G06F 21/6209 380/45 |
| 6,178,243 B1 * | 1/2001 | Pomerantz | G06F 21/606 380/243 |
| 6,373,947 B1 * | 4/2002 | Pomerantz | H04N 1/4486 715/236 |
| 6,820,198 B1 * | 11/2004 | Ross | G06F 21/602 713/165 |
| 6,971,021 B1 * | 11/2005 | Daspit | G06F 21/72 713/192 |
| 7,242,766 B1 * | 7/2007 | Lyle | H04L 9/3271 380/2 |
| 7,950,066 B1 * | 5/2011 | Zuili | G06F 21/6281 726/33 |
| 8,166,132 B1 * | 4/2012 | Mooneyham | H04L 65/762 709/217 |
| 8,171,540 B2 * | 5/2012 | Pulfer | G06Q 10/107 713/168 |
| 8,245,314 B2 * | 8/2012 | Liu | G06F 21/6281 726/32 |
| 8,345,876 B1 * | 1/2013 | Sinn | H04L 9/0656 380/255 |
| 8,347,398 B1 * | 1/2013 | Weber | G06F 21/85 713/189 |
| 8,364,985 B1 * | 1/2013 | Subramanian | G06F 21/85 713/193 |
| 8,396,208 B2 * | 3/2013 | Holtzman | H04L 9/065 380/278 |
| 8,448,260 B1 * | 5/2013 | Hansen | G06F 21/62 726/28 |
| 8,938,067 B2 | 1/2015 | Martin et al. | |
| 8,990,589 B1 * | 3/2015 | Kazarkin | G06F 21/62 713/193 |
| 9,098,713 B2 * | 8/2015 | Lee | G06F 21/602 |
| 9,147,050 B2 * | 9/2015 | Park | G06F 21/6209 |
| 9,460,293 B1 * | 10/2016 | Kashyap | G06F 21/60 |
| 9,584,325 B1 * | 2/2017 | Brandwine | H04L 63/0272 |
| 11,451,864 B2 * | 9/2022 | Mittal | H04N 21/8456 |
| 2003/0161467 A1 | 8/2003 | Ming et al. | |
| 2004/0123112 A1 * | 6/2004 | Himmel | H04L 9/0827 713/182 |
| 2005/0086501 A1 * | 4/2005 | Woo | G06F 21/10 713/189 |
| 2005/0097340 A1 * | 5/2005 | Pedlow | H04N 21/23476 348/E7.06 |
| 2006/0117178 A1 * | 6/2006 | Miyamoto | G06F 21/6209 713/165 |
| 2006/0227967 A1 * | 10/2006 | Nishikawa | H04N 21/4367 380/42 |
| 2006/0294377 A1 * | 12/2006 | Ho | H04L 51/00 713/170 |
| 2007/0011749 A1 * | 1/2007 | Allison | G06F 21/6218 713/165 |
| 2007/0039042 A1 * | 2/2007 | Apelbaum | H04L 9/14 726/6 |
| 2007/0061747 A1 * | 3/2007 | Hahn | G06F 9/543 715/764 |
| 2007/0152058 A1 * | 7/2007 | Yeakley | G06F 16/81 235/375 |
| 2008/0086646 A1 * | 4/2008 | Pizano | H04L 63/0876 713/182 |
| 2008/0112559 A1 * | 5/2008 | Dyne | G09C 1/02 380/28 |
| 2008/0134237 A1 * | 6/2008 | Tu | H04N 7/1675 725/38 |
| 2008/0162527 A1 * | 7/2008 | Pizano | G06F 21/6209 707/999.102 |
| 2010/0020972 A1 * | 1/2010 | Baugher | G06F 21/606 380/255 |
| 2011/0038552 A1 * | 2/2011 | Lam | G06K 19/06009 715/810 |
| 2011/0202762 A1 * | 8/2011 | Hadad | G06F 21/34 713/164 |
| 2011/0211698 A1 * | 9/2011 | Li | H04K 1/00 380/270 |
| 2011/0271178 A1 * | 11/2011 | Feuerbacher | G06F 40/117 715/256 |
| 2012/0076299 A1 * | 3/2012 | Koemmerling | H01R 31/005 380/255 |
| 2012/0226913 A1 * | 9/2012 | Park | G06F 21/10 713/189 |
| 2012/0260100 A1 * | 10/2012 | Applegate | G06F 21/85 713/182 |
| 2013/0010955 A1 * | 1/2013 | Lu | H04L 9/00 380/255 |
| 2013/0013913 A1 * | 1/2013 | Ge | G06F 21/62 713/153 |
| 2013/0080574 A1 * | 3/2013 | Prince | H04L 67/56 709/217 |
| 2013/0086393 A1 * | 4/2013 | Pogmore | G06F 16/81 713/189 |
| 2013/0151864 A1 * | 6/2013 | Lee | G06F 21/6209 713/189 |
| 2013/0236015 A1 * | 9/2013 | Li | H04W 12/033 380/270 |
| 2013/0239192 A1 * | 9/2013 | Linga | G06F 21/44 726/3 |
| 2014/0164776 A1 * | 6/2014 | Hook | G06F 21/6218 713/171 |
| 2015/0026455 A1 * | 1/2015 | Enderwick | H04L 63/08 713/153 |
| 2015/0095643 A1 * | 4/2015 | Adams | G06F 21/6218 713/165 |
| 2016/0037215 A1 * | 2/2016 | Cardona | H04N 21/234309 725/31 |
| 2016/0072776 A1 * | 3/2016 | Yip | H04W 12/033 713/162 |
| 2016/0156467 A1 * | 6/2016 | Seo | H04L 63/06 713/171 |
| 2016/0204940 A1 * | 7/2016 | Zachey | G06F 21/575 713/193 |
| 2016/0260098 A1 * | 9/2016 | Landrock | H04M 1/724092 |
| 2016/0294785 A1 * | 10/2016 | Lim | H04L 51/04 |
| 2016/0306964 A1 * | 10/2016 | Austin | G06F 21/556 |
| 2016/0314720 A1 * | 10/2016 | Kim | G06F 21/72 |
| 2016/0360402 A1 * | 12/2016 | Park | H04L 63/0428 |
| 2016/0364397 A1 * | 12/2016 | Lindner | G06F 40/205 |
| 2016/0380768 A1 * | 12/2016 | Koike | H04L 9/30 380/277 |
| 2017/0004316 A1 * | 1/2017 | Walton | G06F 21/6245 |
| 2017/0046532 A1 * | 2/2017 | Miller | H04L 63/0478 |
| 2017/0161599 A1 * | 6/2017 | Li | G06F 9/543 |
| 2017/0286698 A1 * | 10/2017 | Shetty | H04L 67/10 |
| 2017/0366576 A1 * | 12/2017 | Donahue | H04L 63/1416 |
| 2018/0012032 A1 * | 1/2018 | Radich | H04L 9/30 |
| 2018/0285583 A1 * | 10/2018 | Dogu | H04L 9/0894 |
| 2018/0331824 A1 * | 11/2018 | Racz | H04L 9/14 |
| 2018/0335998 A1 * | 11/2018 | Callaghan | H04L 67/1095 |
| 2019/0147169 A1 * | 5/2019 | Adams | G06F 21/602 713/189 |
| 2020/0007548 A1 * | 1/2020 | Sanghavi | H04L 63/0209 |
| 2020/0014714 A1 * | 1/2020 | Mortensen | H04L 63/1483 |
| 2021/0234939 A1 * | 7/2021 | Vedula | H04L 65/60 |

(56) References Cited

U.S. PATENT DOCUMENTS

FOREIGN PATENT DOCUMENTS

| | | | |
|---|---|---|---|
| JP | 2003-318878 | 11/2003 | |
| JP | 2013-539109 | 10/2013 | |
| JP | 2015-125652 | 7/2015 | |
| JP | 2016-105251 | 6/2016 | |
| RU | 2585988 | 6/2016 | |
| WO | WO-2007074431 A2 * | 7/2007 | ............. G06F 21/34 |

OTHER PUBLICATIONS

C. Ian et al.; "Flaxor: A Symmetric-Key Block Cipher Plug-In using USB Mass Storage Device for Extracted Block Storage"; School of Information Technology; Jupiter: $1^{st}$ ITE Research Colloquim, Mar. 28, 2008; XP55357760, http://flaxor.ianuy.com/Flaxor-ExtendedAbstract-10Pages.pdf; retrieved on Mar. 22, 2017; 10 pages.
PCT/IB2016/001215, Jul. 29, 2016, Pak Kay Yuen, Permanent Privacy Ltd.
Written Opinion of the International Search Authority (PCT Rule 43bis.1); for International Application No. PCT/IB2016/001215 dated Mar. 31, 2017.
Written Opinion of the International Search Authority (PCT Rule 66); for International Application No. PCT/IB2016/001215 dated Jun. 14, 2018.
Notice of Reasons for Refusal, dated Mar. 31, 2020, in corresponding Japanese Application No. 2019-504940 (15 pp.).
European Office Action dated Nov. 29, 2019 in corresponding European Application No. 16774544.7; 6 pages.
Office Action, dated Jun. 30, 2020, in corresponding African Regional Patent Application No. AP/P/2018/011227.
Office Action dated Jul. 3, 2019 in corresponding Pakistani Application No. 411/2017; 3 pages.
Examination Report, dated Jul. 30, 2020, in corresponding Pakistani Application No. 411/2017 (2 pp.).
Pakistani Office Action dated Feb. 4, 2020 in corresponding Pakistani Application No. 411/2017; 3 pages.
Decision of Refusal, dated Nov. 4, 2020, in corresponding Japanese Application No. 2019-504940 (9 pp.).
Office Action, dated Mar. 30, 2020, in corresponding Eurasian Application No. 201990412/31 (4 pp.).
Office Action, dated Jul. 21, 2021, in corresponding Eurasian Patent Application No. 201990412/31 (8 pp.).
Chinese Office Action, dated Jun. 28, 2021, in corresponding Chinese Application No. 201680087984.9 (24 pp.).
Office Action, dated Jun. 9, 2021, in corresponding ARIPO Patent Application No. AP/P/2018/011227 (4 pp.).
Office Action, dated Nov. 27, 2020, in corresponding Eurasian Patent Application No. 201990412/31 (4 pp.).
Patent Examination Report, dated Nov. 12, 2019, in corresponding Iraqi Application No. 2017405 (2 pp.).
PCT International Preliminary Report on Patentability (IPRP), PCT/IPEA/409, dated Aug. 27, 2018 (6 pp.).
First Examination Report, dated Mar. 6, 2019, in corresponding Pakistani Application No. 411/2017 (3 pp.).
Summons to Attend Oral Proceedings Pursuant to Rule 115(1) EPC, dated May 21, 2021, in corresponding European Patent Application No. 16774544.7 (10 pp.).
Examination Report, dated May 22, 2021, in corresponding Indian Patent Application No. 201917001072 (7 pp.).
Office Action, dated Oct. 29, 2021, in corresponding Pakistan Patent Application No. 411/2017 (5 pp.).
Office Action, dated Dec. 30, 2021, in corresponding Iraq Patent Application No. 2017405 (2 pp.).
PC World, Aug. 9, 2002 <URL: https://www.osp.ru/pcworld/2002/08/163808>, including English computer translation (11 pages).
Office Action, dated Apr. 27, 2022, in corresponding Eurasian Patent Application No. 201990412/31 (4 pp.).
Office Action, dated Feb. 7, 2022, in corresponding $2^{nd}$ Chinese Patent Application No. 201680087984.9 (15 pp.) including English translation (10 pp.).
Hongyan Yang, "iPhone & iPad Enterprise Mobile Application Development Tips", Maritime Press, Dec. 31, 2013, pp. 138-141.
Office Action, dated Feb. 1, 2022, in corresponding ARIPO Patent Application No. AP/P/2018/011227 (4 pp.).

* cited by examiner

| | A | B | C | D | E | F | G | H |
|---|---|---|---|---|---|---|---|---|
| 1 | SURE | | | | | | | |
| 2 | | | | | | | | |
| 3 | CK.# | DATE | ITEM DESCRIPTION | DEBIT | CREDIT | X | BALANCE | |
| 4 | | #### | JANUARY PAYCHECK | | £1,795.86 | | £1,795.86 | |
| 5 | 100 | #### | SHELL OIL CO. | £42.64 | | | £1,753.22 | |
| 6 | 101 | #### | PINK PALACE ENTER. | £87.34 | | | £1,665.88 | |
| 7 | | #### | CASH (AUTO TRADER) | £50.00 | | | £1,615.88 | |
| 8 | 102 | #### | DR. D. J. HOUSTON | £75.00 | | | £1,540.88 | |
| 9 | 103 | #### | RENT | £800.00 | | | £740.88 | |
| 10 | | #### | ONLINE SALES | | £2,500.00 | | £3,240.88 | |
| 11 | 104 | #### | ONLINE SALES COST | £500.00 | | | £2,740.88 | |
| 12 | 105 | #### | BENNY THE WEASEL | £3,200.00 | | | -£459.12 | |
| 13 | | #### | RAINY DAY QUARTER FUND | | £500.00 | | £40.88 | |
| 14 | | | | | | | | |
| 15 | | | | | | | | |
| 16 | | | | | | | | |

Fig. 7

APPLICATIONS IN CONNECTION WITH SECURE ENCRYPTION

BACKGROUND

1. Field

The device relates to encryption, and particularly to encryption across different memories, cloud platforms, operating systems, and other products.

2. Description of the Related Art

Many encryption engines or systems, such as those described in U.S. Pat. Nos. 7,751,565 and 8,595,508, can perform functional encryption/decryption and produce full scale coding or full section of the cipher text or cipher text stream. These full scale cipher streams, in many cases, are not readable, not displayable, not easy to communicate, and sometimes difficult to integrate with other devices and products. In today's Internet, Cloud and integratable environment, full scale coding forms a major deficiency of encryption engines and encryption systems, affecting their applications on a global scale.

SUMMARY

In a first aspect, an encryption box device includes a memory and a processor coupled to the memory. A first clipboard runs on the processor and downloads a plaintext stream. An encryption engine runs on the processor and receives the plaintext stream and encrypts the plaintext stream to produce an encrypted stream. The encryption engine may also decrypt the encrypted stream to produce the plaintext stream and upload the plaintext stream to the first clipboard.

In a second aspect, digitizer runs on the processor and digitizes the encrypted stream to produce a digitized encrypted stream. The digitizer digitizes the encrypted stream according to a mode such as no digitization, Base 64 digitization, hexadecimal numbers without spacing, paired hexadecimal numbers with spacing, a user-defined mode, or save as a file (flag).

In a third aspect, second clipboard runs on the processor and uploads the digitized encrypted stream.

In a fourth aspect, the encryption box device may also include a de-digitizer running on the processor that downloads the digitized encryption stream from the second clipboard and de-digitizes the digitized encryption stream to produce the encrypted stream. The de-digitizer may then provide the encrypted stream to the encryption engine.

In a fifth aspect, the de-digitizer de-digitizes the digitized encryption stream according to a mode such as no de-digitization, Base 64, hexadecimal numbers without spacing, paired hexadecimal numbers with spacing, a user-defined mode, or save as a file (flag).

In a sixth aspect, the encryption box device may be a dongle that can be plugged into a computer such as a personal computer, a laptop, a smart phone, a tablet, a smart TV, an intelligent network drive, a central storage, or a set-top box.

In a seventh aspect, the encryption box device may be a USB device that can be plugged into a computer such as a personal computer, a laptop, a smart phone, a tablet, a smart TV, an intelligent network drive, a central storage, or a set-top box.

In an eighth aspect, the encryption box device may include wireless communication such as Wi-Fi or Bluetooth.

In a ninth aspect, the encryption box device may be any device or communications platform which can display, store or exchange data including but not limited to a Mobile Phone, an isdn phone, a smart TV, an Intelligent Network Drive, central storage, a smart phone, a display screen, a telephone exchange, a tablet, a computer, a radio, or the cloud, Unified Communications, any form of enterprise communication services, instant messaging (chat), presence information, voice (including IP telephony), mobility features (including extension mobility and single number reach), audio, web & video conferencing, fixed-mobile convergence (FMC), desktop sharing, data sharing (including web connected electronic interactive whiteboards), call control, speech recognition, any form of communication services, unified messaging (integrated voicemail, e-mail, SMS and fax), any set of products that provides a consistent unified user-interface and user-experience across multiple devices and media-types, all forms of communications that are exchanged via a network to include other forms of communications such as Internet Protocol Television (IPTV) and digital signage Communications, any integrated part of a network communications deployment that may be directed as one-to-one communications or broadcast communications from one to many, communications allowing an individual to send a message on one medium, and receive the same communication on another medium (for example, one can receive a voicemail message and choose to access it through e-mail or a cell phone. If the sender is online according to the presence information and currently accepts calls, the response can be sent immediately through text chat or video call. Otherwise, it may be sent as a non-real-time message that can be accessed through a variety of media), multimodal communications, speech access and personal assistant, conferencing (audio, Web and video), collaboration tools, mobility, business process integration (BPI) and software to enable business process integration.

In a $10^{th}$ aspect, the encryption box device may include proprietary wireless communication and a plurality of wireless adapters that can be plugged into a computer such as a personal computer, a laptop, a smart phone, a tablet, a smart TV, an intelligent network drive, a central storage, and a set-top box. Use of the encryption box device may be limited to a user of one of the wireless adapters.

In an $11^{th}$ aspect, the encryption box device may be simulated by a hardware emulator, such as an emulator running on a computer.

In a $12^{th}$ aspect, a method of secure encryption using an encryption box device includes a first operation of plugging the encryption box device into a computer. The method of secure encryption then performs a second operation of running an application on the computer. The method of secure encryption then performs a third operation of downloading a plaintext stream from the application to a first clipboard. The method of secure encryption then performs a fourth operation of encrypting the plaintext stream to produce an encrypted stream. The method of secure encryption then performs a fifth operation of digitizing the encrypted stream to produce a digitized encrypted stream. The method of secure encryption then performs a sixth operation of uploading the digitized encrypted stream to a second clipboard.

In a $13^{th}$ aspect, the application may be a spreadsheet, a text window, an email, a word processor, a chat room, or a presentation.

In a 14th aspect, the method of secure encryption may further include a seventh operation of digitizing the encrypted stream according to a mode such as no digitization, Base 64 digitization, hexadecimal numbers without spacing, paired hexadecimal numbers with spacing, a user-defined mode, or save as a file (flag).

In a 15th aspect, the method of secure encryption may further include an eighth operation of downloading the digitized encryption stream from the second clipboard. The method of secure encryption may further include a ninth operation of de-digitizing the digitized encryption stream to produce the encrypted stream and providing the encrypted stream to the encryption engine. The method of secure encryption may further include a 10th operation of decrypting the encrypted stream to produce the plaintext stream and uploading the plaintext stream to the first clipboard.

In a 16th aspect, the method of secure encryption may further include an 11th operation of de-digitizing the digitized encryption stream according to a mode such as no de-digitization, Base 64, hexadecimal numbers without spacing, paired hexadecimal numbers with spacing, a user-defined mode, or save as a file (flag).

In a 17th aspect, the method of secure encryption may further include a 12th operation of simulating the encryption box device using a hardware emulator.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles and to enable a person skilled in the pertinent art to make and use the invention. In the drawings, like reference numbers indicate identical or functionally similar elements. A more complete appreciation and many of the attendant advantages thereof will be readily obtained as the same becomes better understood by reference to the following detailed description when considered in connection with the accompanying drawings, wherein:

FIG. 7 shows a clickable tag called "ppExcel30" for use with an embodiment;

DETAILED DESCRIPTION OF THE PREFERRED EMBODIMENTS

Figure 1:
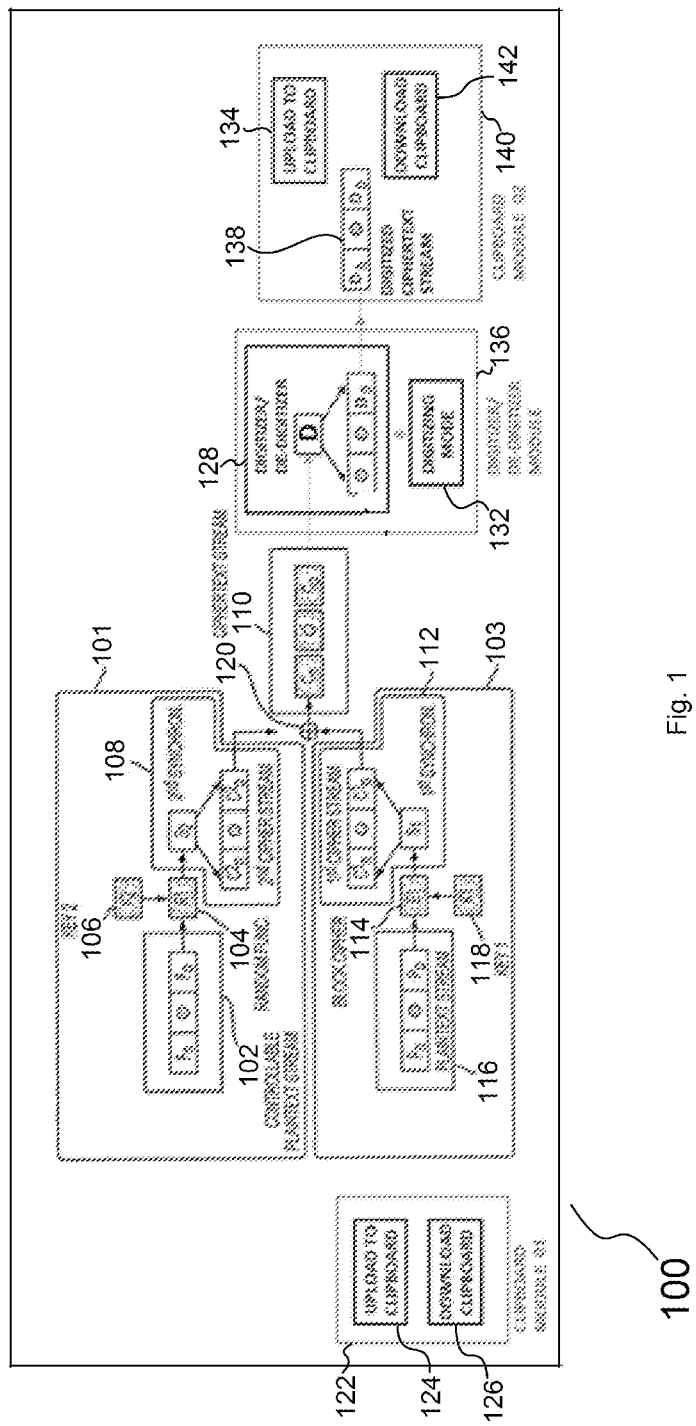
FIG. 1 shows an encryption box device according to a first embodiment.

A first embodiment of an encryption box device 100 is shown in FIG. 1. A first clipboard Module 122, a second Clipboard Module 140, and a Digitizer/De-digitizer 128 were added to the Encryption Engine to overcome the deficiency of the Encryption Engine and make it compatible and available for all different memories, cloud platforms, operating systems, and communicate amongst other products.

In order to travel, or be compatible, among all different memories, operating systems etc, a special memory (hardware memory) structure of "Clipboard" is used. Clipboard (or Clipboard cache) is a special memory in all devices including computers, mobile phones, and tablets. Clipboard alone cannot handle all incompatibility problems; a "Digitizer/De-digitizer Module" is 136 (in FIG.2, 236) is also needed.

In the encryption box device 100 shown in FIG. 1, a first clipboard 122 runs on a processor and downloads a plaintext stream 116 using download clipboard 126.

An encryption engine runs on the processor and receives the plaintext stream 116 and encrypts the plaintext stream 116 to produce a cipher text or encrypted stream 110. The encryption engine may also decrypt the encrypted stream 110 to produce the plaintext stream 116 and upload the plaintext stream 116 to the first clipboard 122 using upload clipboard 124.

A digitizer/de-digitizer 128 runs on the processor and digitizes the encrypted stream 110 to produce a digitized encrypted stream 138. The digitizer/de-digitizer 128 digitizes the encrypted stream 110 according to a mode 132 such as no digitization, Base 64 digitization, hexadecimal numbers without spacing, paired hexadecimal numbers with spacing, a user-defined mode, or save as a file (flag).

A second clipboard 140 runs on the processor and uploads the digitized encrypted stream 138 using upload clipboard 134.

The digitizer/de-digitizer 128 running on the processor may also download the digitized encryption stream 138 from the second clipboard 140 using the download clipboard 142 and de-digitize the digitized encryption stream 138 to produce the encrypted stream 110. The digitizer/de-digitizer 128 may then provide the encrypted stream 110 to the encryption engine.

The digitizer/de-digitizer 128 de-digitizes the digitized encryption stream 138 according to a mode 132 such as no de-digitization, Base 64, hexadecimal numbers without spacing, paired hexadecimal numbers with spacing, a user-defined mode, or save as a file (flag).

The encryption box device 100 may be a dongle that can be plugged into a computer such as a personal computer, a laptop, a smart phone, a tablet, a smart TV, an intelligent network drive, a central storage, or a set-top box.

The encryption box device 100 may be a USB device that can be plugged into a computer such as a personal computer, a laptop, a smart phone, a tablet, a smart TV, an intelligent network drive, a central storage, or a set-top box.

The encryption box device 100 may include wireless communication such as Wi-Fi or Bluetooth.

The encryption box device 100 may be a Mobile Phone, an isdn phone, skype, viber, Whatsapp, a smart TV, an Intelligent Network Drive, central storage, a smart phone, a display screen, a telephone exchange, a tablet, a computer, a radio, or the cloud.

The encryption box device 100 may include proprietary wireless communication and a plurality of wireless adapters that can be plugged into a computer such as a personal computer, a laptop, a smart phone, a tablet, a smart TV, an intelligent network drive, a central storage, and a set-top box. Use of the encryption box device 100 may be limited to a user of one of the wireless adapters.

The encryption box device 100 may be simulated by a hardware emulator, such as an emulator running on a computer.

A first cipher stream generator 103 generates and synchronizes a first cipher stream using the plaintext information 116 and a first key 118. A second cipher stream generator 101 generates and synchronizes a second cipher stream using a second key 106 and a randomizing function 104 to randomize and then synchronize a controllable plaintext stream 102. An exclusive disjunction operator 120 operating on the first and second synchronized cipher streams obtains the cipher text stream 110.

The first cipher stream generator 103 includes a block cipher encryption unit 114 that generates and synchronizes the first synchronized cipher stream upon input of plaintext information 116 and a first key 118. A block cipher encryption device 114 generates the first cipher stream and a first synchronization unit 112 synchronizes the first cipher stream.

The second cipher stream generator 101 includes a random function generator that randomize is, and then synchronizes, the controllable plaintext stream 102 upon input of a second key 106 and the controllable plaintext stream 102, and outputs a second synchronized cipher stream. The random function generator includes a random function generator device 104 to randomize the controllable plaintext stream and a second synchronization unit 108 (in FIG. 2, 208) to synchronize the randomized second cipher stream.

Figure 2:
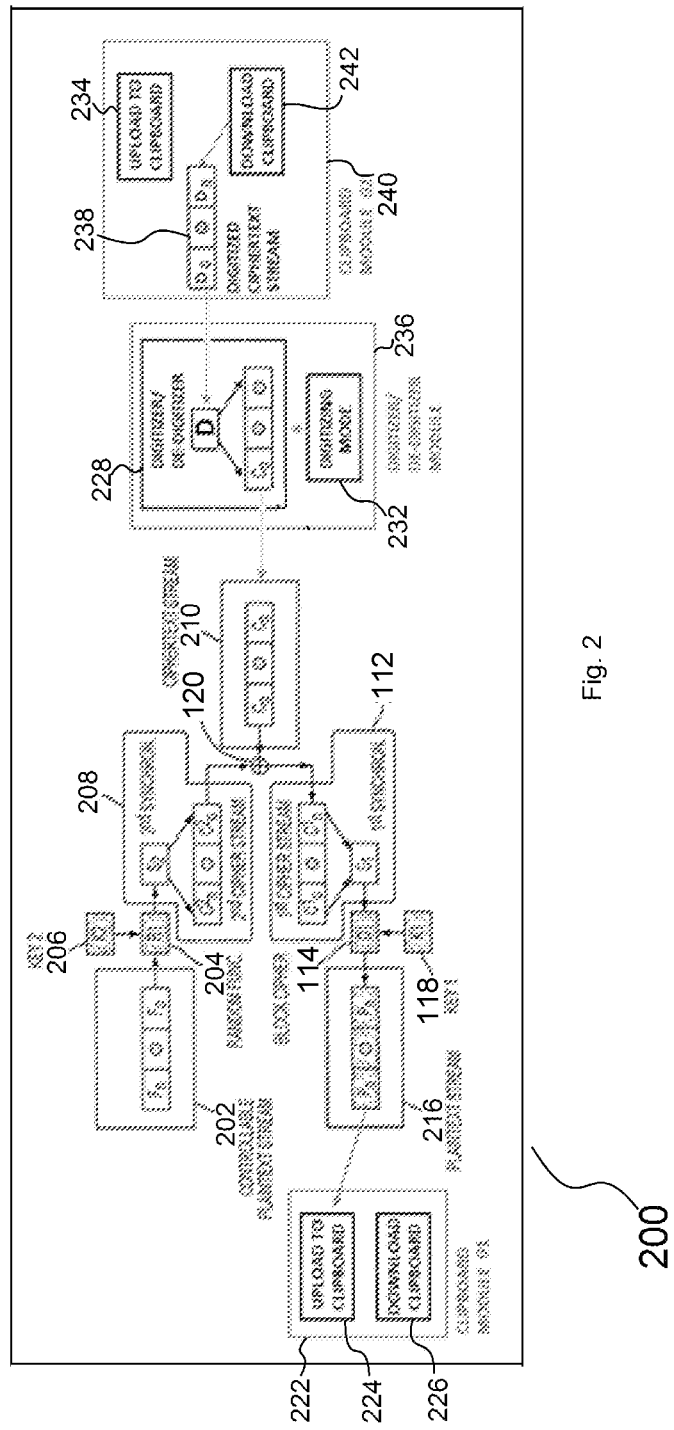
FIG. 2 shows an encryption box device according to a second embodiment.

A second embodiment of an encryption box device 200 is shown in FIG. 2.

In the encryption box device 200 shown in FIG. 2, a first clipboard 222 runs on a processor and downloads a plaintext stream 216 using download clipboard 226.

An encryption engine runs on the processor and receives the plaintext stream 216 and encrypts the plaintext stream 216 to produce a cipher text or encrypted stream 210. The encryption engine may also decrypt the encrypted stream 210 to produce the plaintext stream 216 and upload the plaintext stream 216 to the first clipboard 222 using upload clipboard 224.

A digitizer/de-digitizer 228 runs on the processor and digitizes the encrypted stream 210 to produce a digitized encrypted stream 238. The digitizer/de-digitizer 228 digitizes the encrypted stream 210 according to a mode 232 such as no digitization, Base 64 digitization, hexadecimal numbers without spacing, paired hexadecimal numbers with spacing, a user-defined mode, or save as a file (flag).

A second clipboard 240 runs on the processor and uploads the digitized encrypted stream 238 using upload clipboard 234.

The digitizer/de-digitizer 228 running on the processor may also download the digitized encryption stream 238 from the second clipboard 240 using the download clipboard 242 and de-digitize the digitized encryption stream 238 to produce the encrypted stream 210. The digitizer/de-digitizer 228 may then provide the encrypted stream 210 to the encryption engine.

The digitizer/de-digitizer 228 de-digitizes the digitized encryption stream 238 according to a mode 232 such as no de-digitization, Base 64, hexadecimal numbers without spacing, paired hexadecimal numbers with spacing, a user-defined mode, or save as a file (flag).

The encryption box device 200 may be a dongle that can be plugged into a computer such as a personal computer, a laptop, a smart phone, a tablet, a smart TV, an intelligent network drive, a central storage, or a set-top box.

The encryption box device 200 may be a USB device that can be plugged into a computer such as a personal computer, a laptop, a smart phone, a tablet, a smart TV, an intelligent network drive, a central storage, or a set-top box.

The encryption box device 200 may include wireless communication such as Wi-Fi or Bluetooth.

The encryption box device 200 may be a Mobile Phone, an isdn phone, Skype, Viber, Whatsapp, a smart TV, an Intelligent Network Drive, central storage, a smart phone, a display screen, a telephone exchange, a tablet, a computer, a radio, or the cloud.

The encryption box device 200 may include proprietary wireless communication and a plurality of wireless adapters that can be plugged into a computer such as a personal computer, a laptop, a smart phone, a tablet, a smart TV, an intelligent network drive, a central storage, and a set-top box. Use of the encryption box device 200 may be limited to a user of one of the wireless adapters.

The encryption box device 200 may be simulated by a hardware emulator, such as an emulator running on a computer.

The second synchronized cipher stream is generated. A controllable plaintext 202 that matches the controllable plaintext 102 shown in FIG. 14, a random function 204 that matches the random function 104, and a second key 206 that matches the second key may be used. The controllable plaintext 202 and the random function 104 are typically transmitted separately from the transmitting agent to the receiving agent, and the second key 106 is generally already known to the receiving agent.

Figure 3:
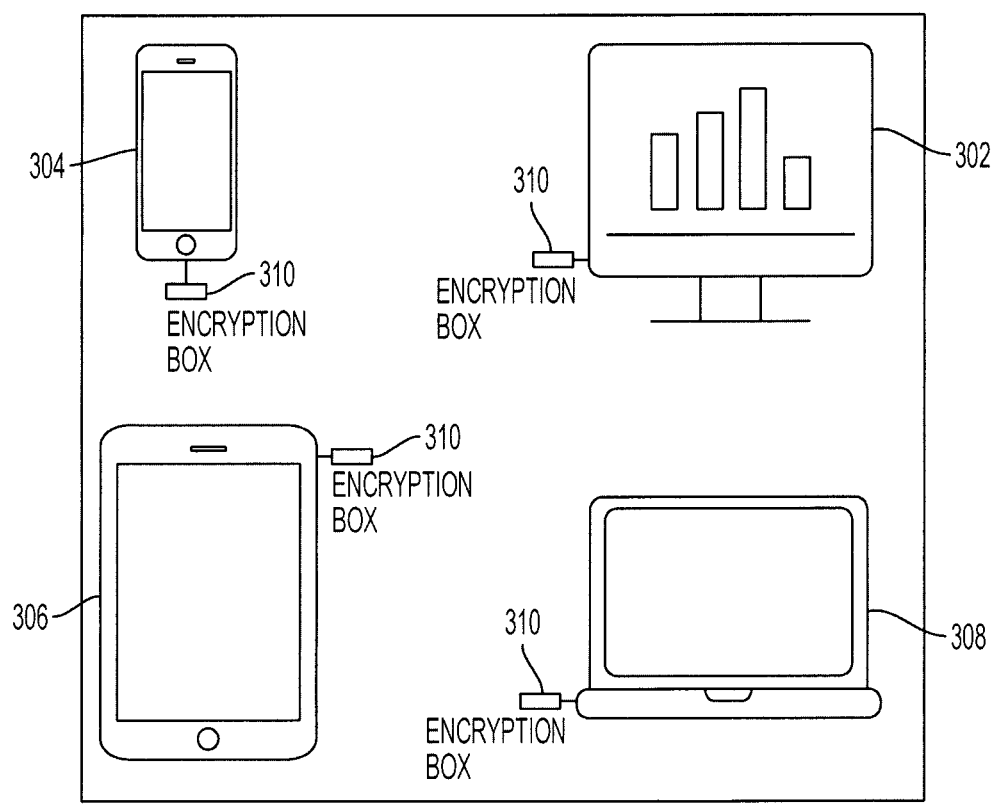
FIG. 3 shows a single encryption box dongle and USB device for use with an embodiment.

In FIG. 3 is shown a single encryption box dongle and USB device 310 for use with an embodiment. The single encryption box dongle and USB device 310 is called an "Encryption-Box" and may be used with PCs, Laptops, Smart Phones, (iPhones & Android Phones) and Smart Tablets such as iPads.

The encryption-box will contain the Encryption Engine with Digitizer/De-digitizer and Clipboard described above.

The single encryption box dongle and USB device 310 can be plugged into a PC 302, a Laptop 308, or a Smart Phone and/or Tablet 304 and 306 and provide direct encryption/decryption for one user.

Figure 4:
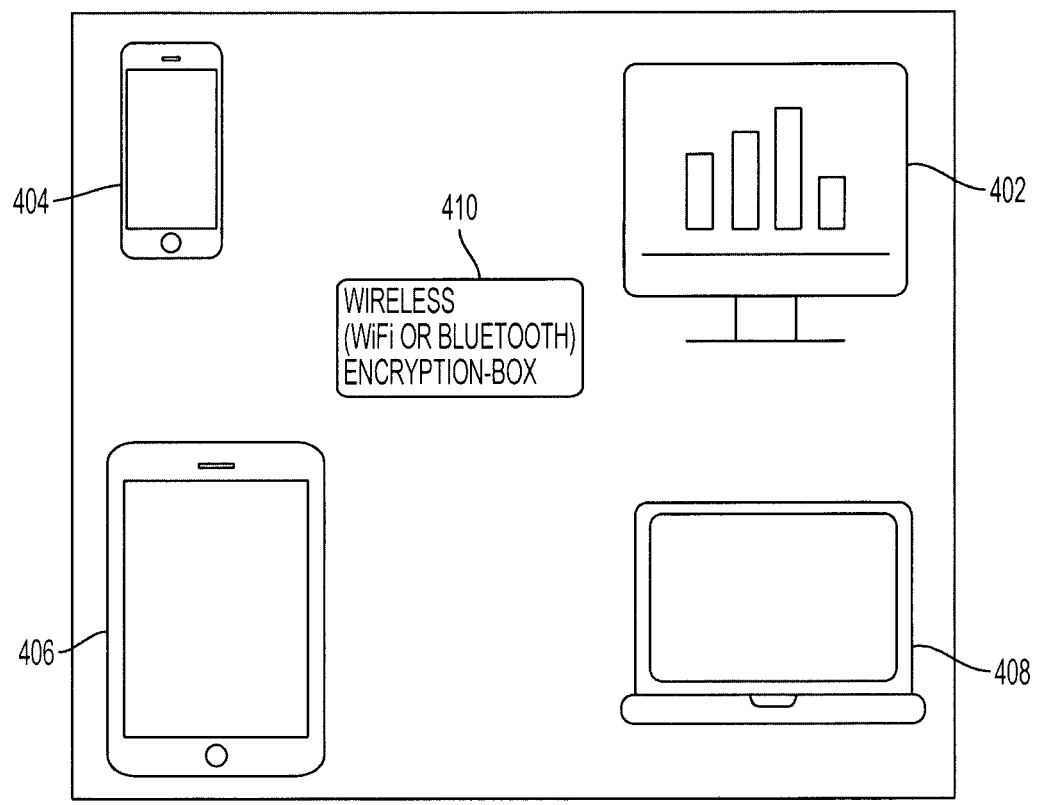
FIG. 4 shows a wireless encryption box for use with an embodiment.

In FIG. 4 is shown a Wireless (WiFi or Bluetooth) Encryption-Box 410 for use with an embodiment. In order for more people to use the Encryption-Box, the wireless encryption box 410 will contain the Encryption Engine, Digitizer/De-digitizer, and Clipboard Modules together with Wireless (WiFi or Bluetooth) Modules. This device will allow multiple people to use the encryption-box at the same time. The wireless encryption box 410 may be used with a PC 402, a Laptop 408, or a Smart Phone and/or Tablet 404 and 406.

Figure 5:
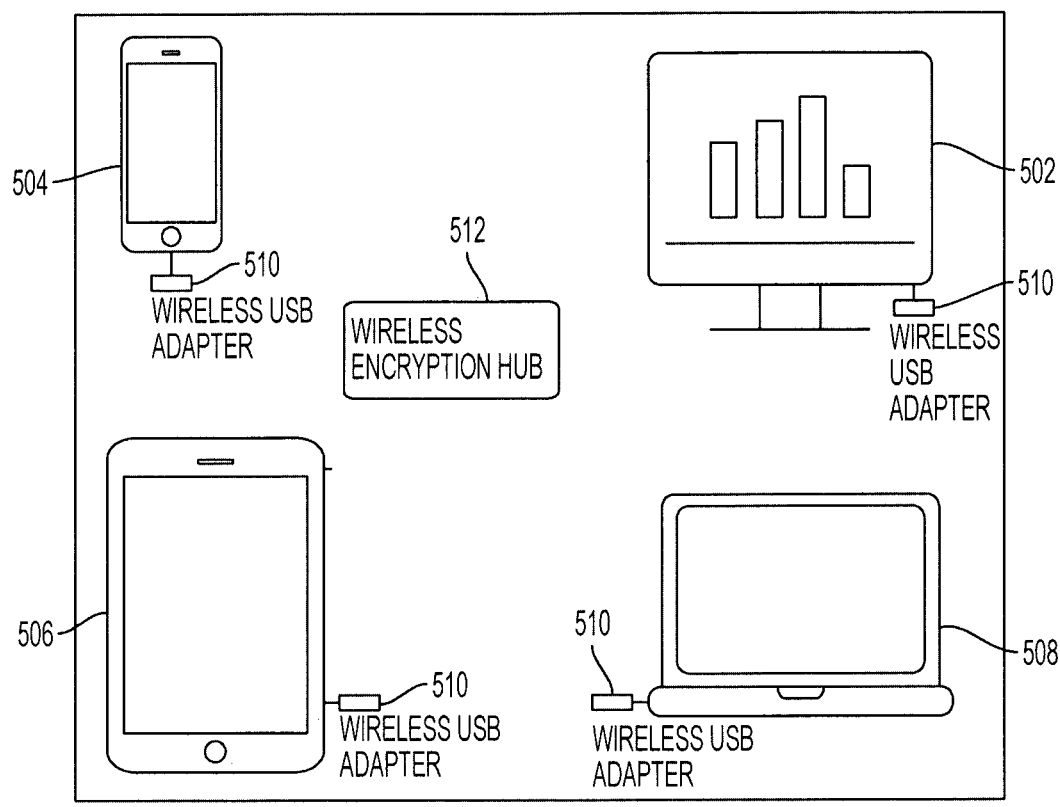
FIG. 5 is shown a wireless encryption-hub with multiple wireless adapters for use with an embodiment.

In FIG. 5 is shown a Wireless Encryption-Hub with Multiple Wireless Adapters 512 for use with an embodiment. In order for more people to use the Encryption-Box, the wireless encryption hub 512 will contain the Encryption Engine, Digitizer/De-digitizer, Clipboard Modules together with Wireless (WiFi or Bluetooth) Modules. This device will allow multiple people to use the encryption-box at the same time. The wireless encryption hub 512 may be used with a PC 502, a Laptop 508, or a Smart Phone and/or Tablet 504 and 506.

A Wireless USB Adapter 510 contains the wireless transmission corresponding to the wireless encryption hub 512, and allows multiple people to use the wireless encryption hub 512 at the same time. The Wireless USB Adapter 510 contains Wireless Proprietary Modules corresponding to the Encryption-Hub 512.

Users can buy one Wireless Encryption-Hub 512 and multiple Wireless Adapters 510. Each adapter 510 can be plugged into a PC 502, a Laptop 508, or a Smart Phone and/or Tablet 504 and 506 directly. Only the adapter 510 users can use encryption/decryption provided by the wireless encryption-hub 512.

Figure 6:
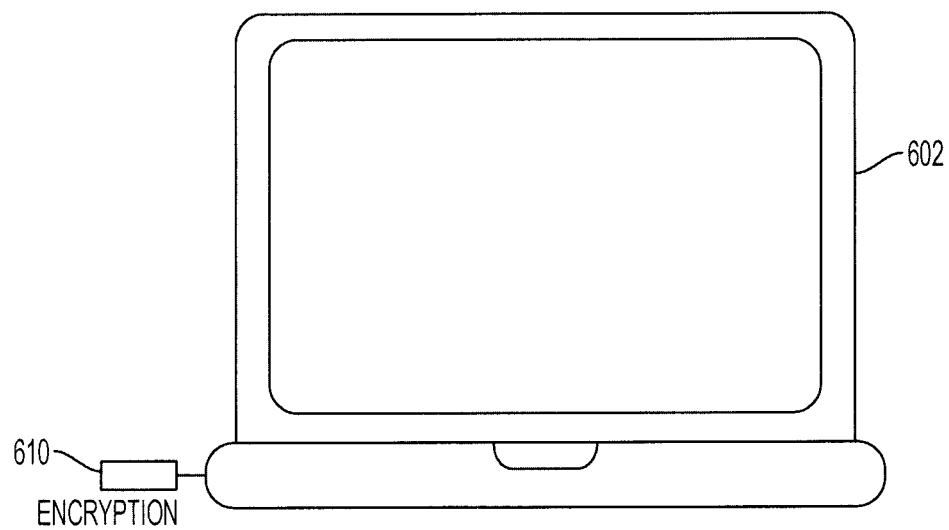
FIG. 6 shows an encryption box for use with an embodiment.

In FIG. 6 is shown an encryption box 610 plugged into a device such as a PC 602. Once the encryption box 610 is plugged into a device such as a PC 602, a number of applications can be downloaded and installed automatically or manually.

In one embodiment, ppExcel, which integrates Microsoft Excel and the encryption box 610, is fully embedded inside MS Excel to provide encryption/decryption on MS Excel cells regardless of cells' type.

It is well known that the complications of cells format of MS Excel such as number cells, text cells, and formula cells forming a major difficulty for any encryption engine to provide security encryption successfully. These different cell types are not compatible each other, but are inter-related. When changing one type of cells such as formula cells with encryption, all other dependent cells such as number cells will changed to difficult status immediately. For this reason, it is believed that no traditional encryption engine can provide encryption successfully on Excel cells regardless of its types. With a digitizer and clipboard module, the encryption box 610 can provide a solution to this problem.

Once the encryption box 610 is plugged into a device such as a PC 602, the encryption box 610 will install a clickable tag 702 called "ppExcel30", as shown in FIG. 7. When this ppExcel30 tag is clicked, a series of functional buttons 704 will appear onto the MS Excel software.

The functional buttons 704 provided by ppExcel can be used for encryption and decryption on selected cells, entire sheet, and the whole workbook of Excel regardless of the cell types. It is believed that ppExcel is the first encrypter to provide cells encryption for MS Excel successfully in this style.

The following process describes the basic encryption of ppExcel on MS Excel cells:
1. Highlight the selected original cells in Excel that you want to encrypt,
2. Press the "Enc/Dec Selected Cells" button,
3. ppExcel will copy all selected cells and send them to the Encryption-Box one-by-one,
4. After the encryption by the Encryption-Box, the cell contents will be sent to clipboard,
5. ppExcel will then paste the encrypted cell contents on clipboard back to its former cell location.

The following process describes the basic decryption of ppExcel on MS Excel cells with respect to FIG. 7:
1. Highlight the selected encrypted cells in MS Excel that you want to decrypt,
2. Press the "Enc/Dec Selected Cells" button,
3. ppExcel will copy all selected encrypted cells and send them to the Encryption-Box one-by-one. Since they are ppExcel encrypted (in Digitized Cipher text Stream format), Encryption-Box will perform decryption automatically,
4. After the decryption by the Encryption-Box, the original cell will be sent to clipboard,
5. ppExcel will then paste the cell on clipboard back to its former cell location.

Figure 8:
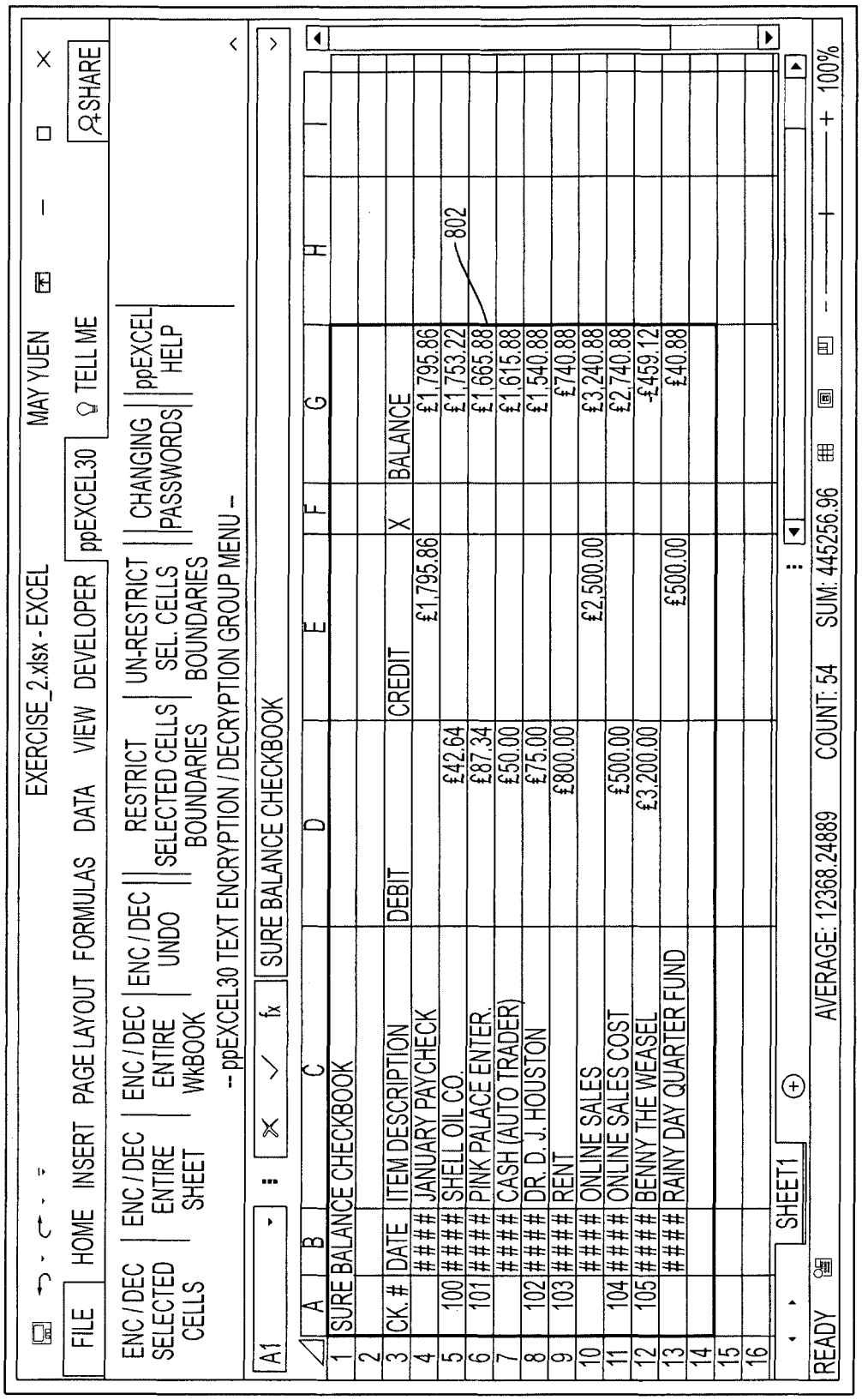
FIG. 8 shows a process of encrypting the MS Excel cells with ppExcel for use with an embodiment.
Figure 9:
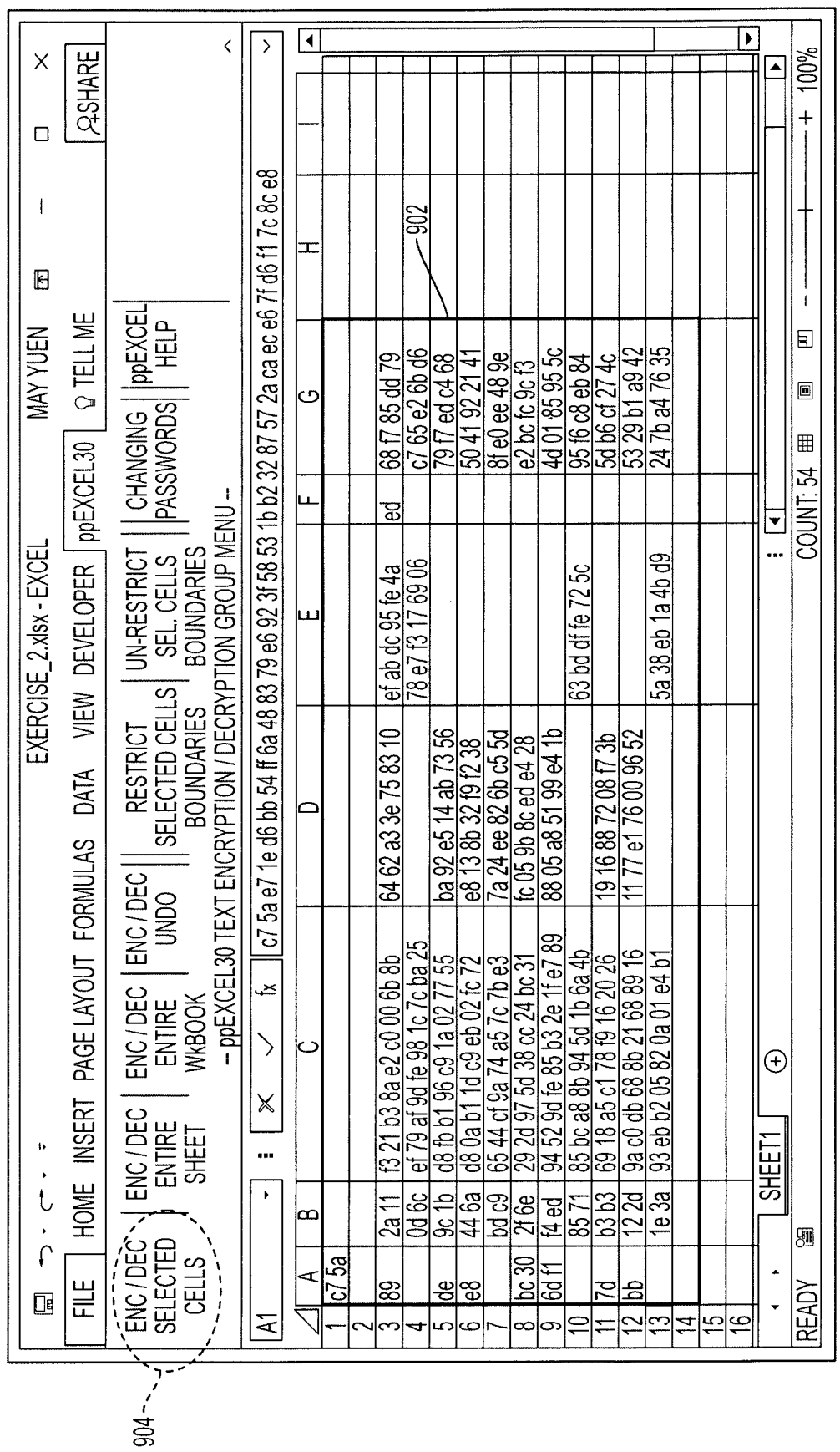
FIG. 9 shows a process of encrypting the MS Excel cells with ppExcel for use with an embodiment.

A process of encrypting the MS Excel cells with ppExcel is shown in FIGS. 8 and 9.
1. First mark (or highlight) the cells that you want to encrypt 802 from MS Excel,
2. Click the "Enc/Dec Selected Cells" button 904,
3. The selected original cells of MS Excel 802 will be replaced by the encrypted cells 902.

By using the similar construction, the following associated prototypes are also established:
1. ppOutlook, which integrates MS Outlook and the Encryption-Box.
2. ppWord, which integrates MS Word and the Encryption-Box.
3. ppPowerPoint, which integrates MS PowerPoint and the Encryption-Box.

Figure 10:
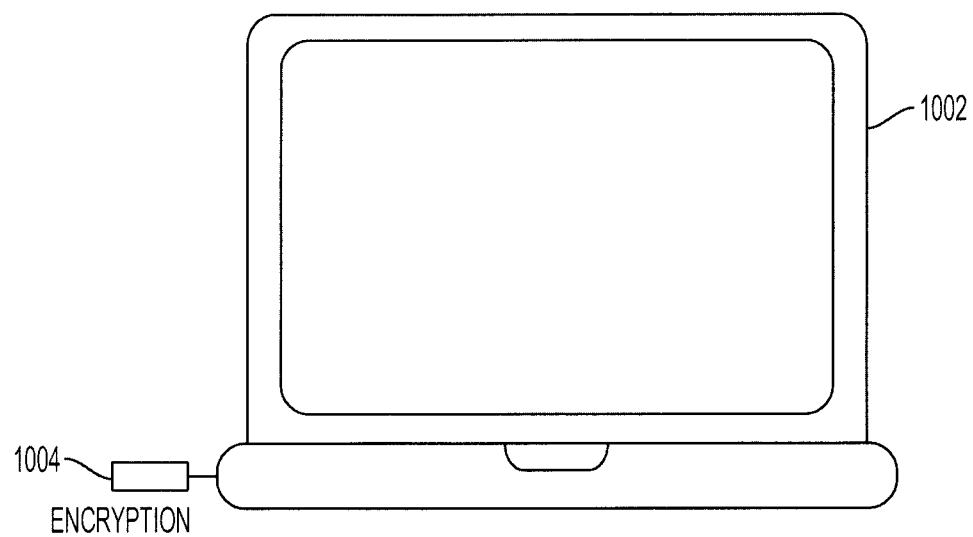
FIG. 10 shows an encryption box plugged into a machine for use with an embodiment.
Figure 11:
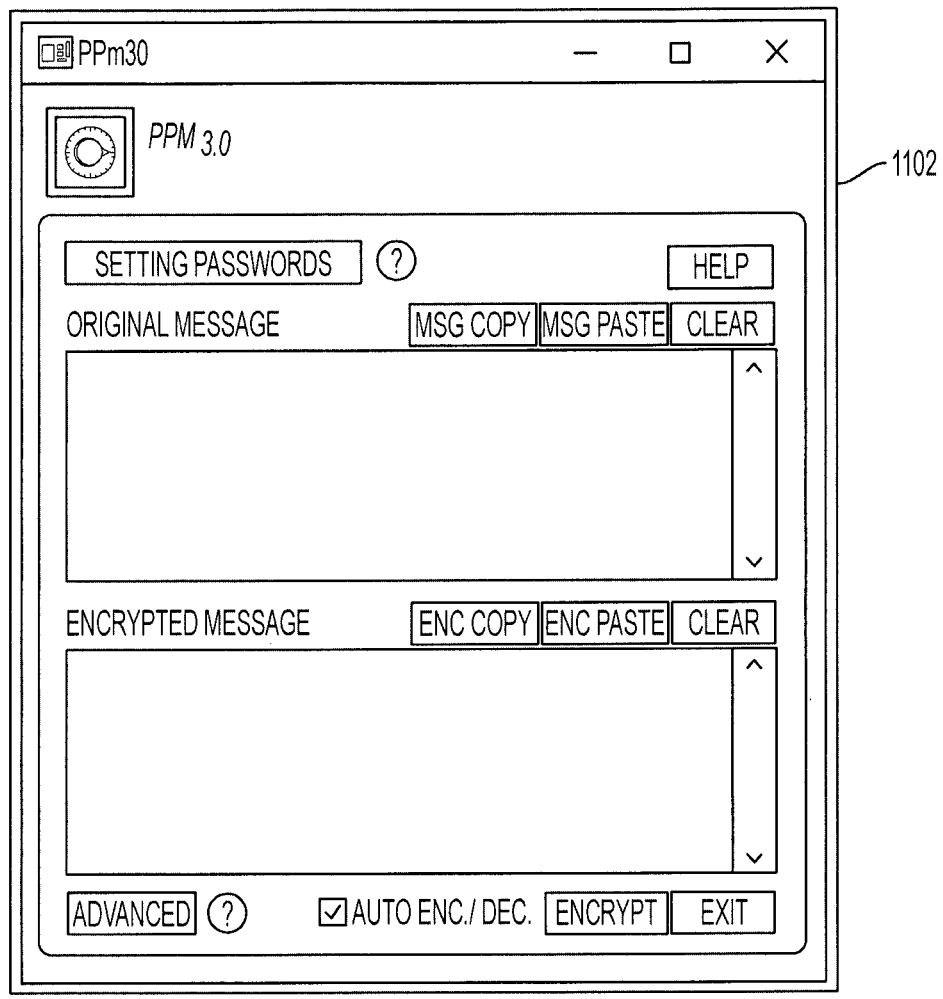
FIG. 11 shows a Universal Text Encrypter using the encryption box for use with an embodiment.

In another embodiment, shown in FIGS. 10 and 11, PPM, which is a Universal Text Encrypter using the encryption box 1004, can use the encryption box 1004 for any text encryption/decryption from any other programs.

Due to the complications of all different programs in different platforms (or operating systems) that produce texts, it is not easy for traditional encryption engines to construct a universal encrypter that can encrypt/decrypt texts for all of them. With the digitizer and clipboard modules, the encryption-box 1004 establishes a universal encrypter called PPM (Professional Protection for Messages) to encrypt/decrypt any text from any other programs.

Once the encryption box 1004 is plugged into a machine 1002, as shown in FIG. 10, the encryption box 1004 will download and install a program called "PPM" 1102, which is shown in FIG. 11. PPM 1102 is a universal text encrypter for any text related program. Any text change in the Original Message window will trigger automatic encryption and the encryption results will appear in the Encrypted Message window. Any text change on the Encrypted Message window will trigger auto-decryption and the decryption results will appear on the Original Message window.

The buttons provided by PPM can be used for encryption and decryption on any text from any program. When you type a piece of text into the Original Message window, it will be encrypted automatically and the encrypted message will appear in the Encrypted Message window.

Among the buttons may be:

Msg Copy—Copy the text in the Original Message window onto the Clipboard,

Msg Paste—Download the text from the Clipboard into the Original Message window. (Auto-Encrypt) This will trigger auto-encryption and decryption results appear in the Encrypted Message window (digitizing mode=3 is used), Enc Copy—Copy the encrypted text from the Encrypted Message window onto the Clipboard Enc Paste—Download the encrypted text from the Clipboard into the EncryptedMessage window. The encrypted text will be decrypted automatically and appear in the Original Message window. This may also be referred to as Auto-Decrypt.

Figure 12:
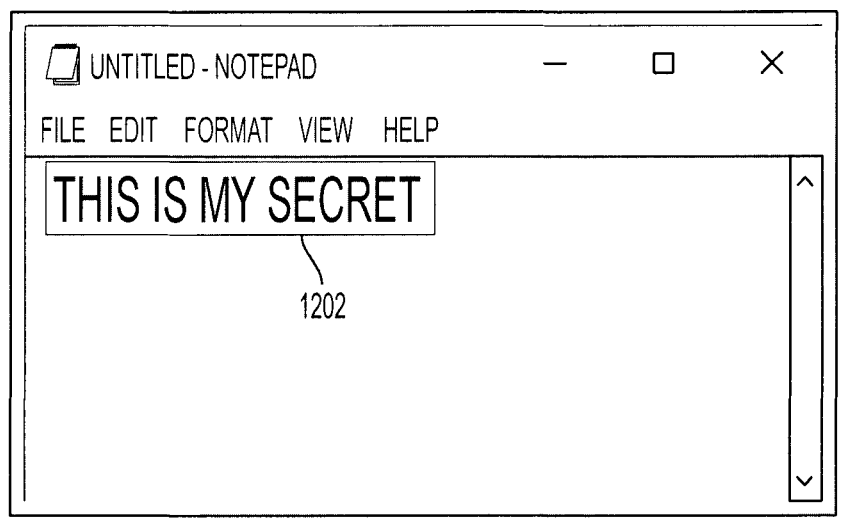
FIG. 12 shows a encryption process for use with an embodiment.
Figure 13:
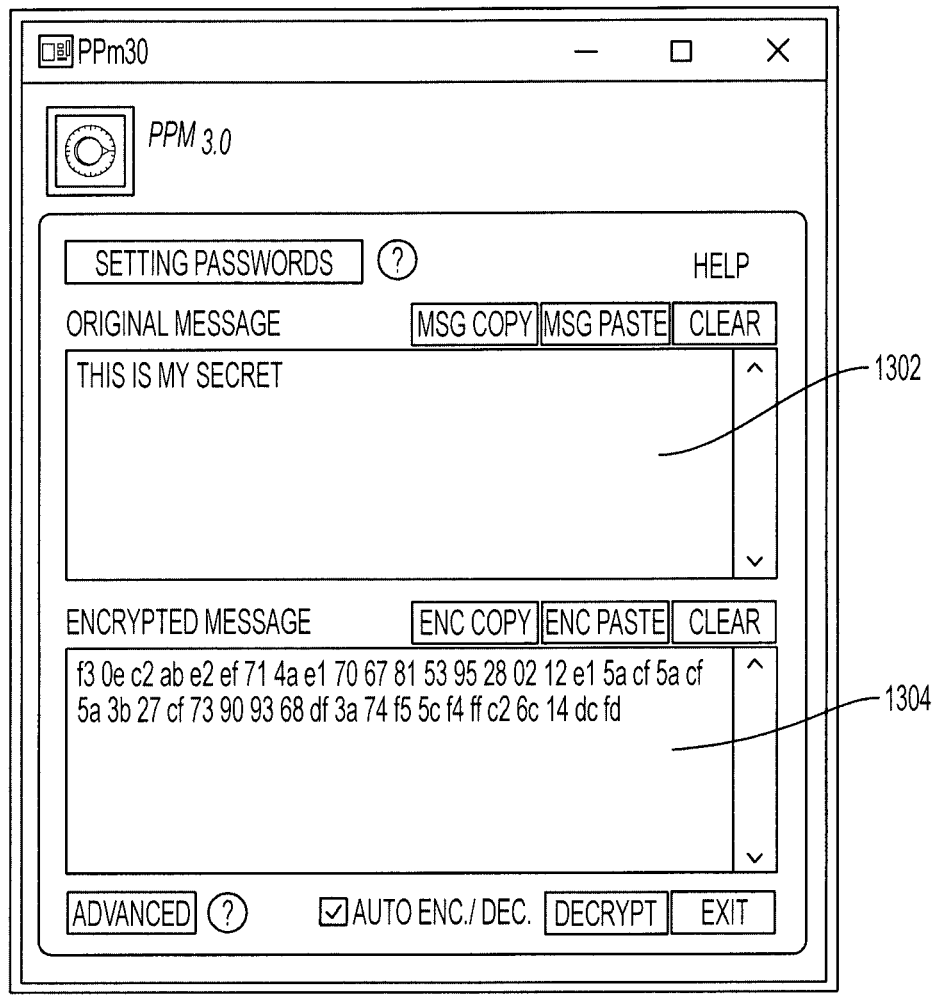
FIG. 13 shows a encryption process for use with an embodiment.

The encryption process of PPM will be described with respect to FIGS. 12 and 13:

1. Hightlight and press the Control-C key on selected text 1202 such as "This is my secret" from any text related program (This will send the selected text to Clipboard)

2. Press the "Msg Paste" button of PPM (The PPM will copy the text from the Clipboard and paste to the Original Message window)

3. The text in the Original Message window 1302 will be encrypted automatically and immediately 4. The encrypted text will appear in the Encrypted Message window 1304 as "f3 0e c2 ab e2 ef 71 4a e1 70 67 81 53 95 28 02 12 e1 5a cf 5a 3b 27 cf 73 90 93 68 df 3a 74 f5 5c f4 ff c2 6c 14 dc fd"

paired hexadecimal numbers with space (or digitizing mode=3).

Figure 14:
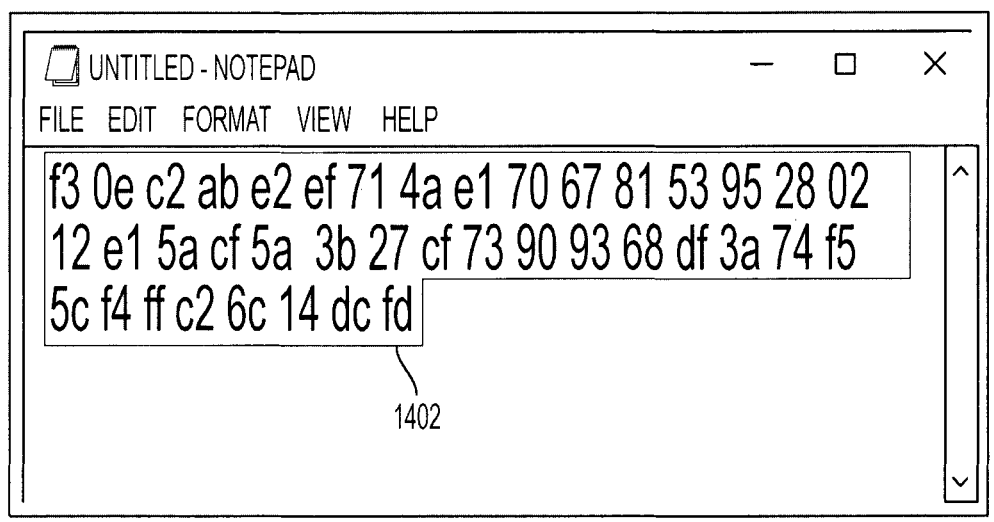
FIG. 14 shows a decryption process for use with an embodiment.
Figure 15:
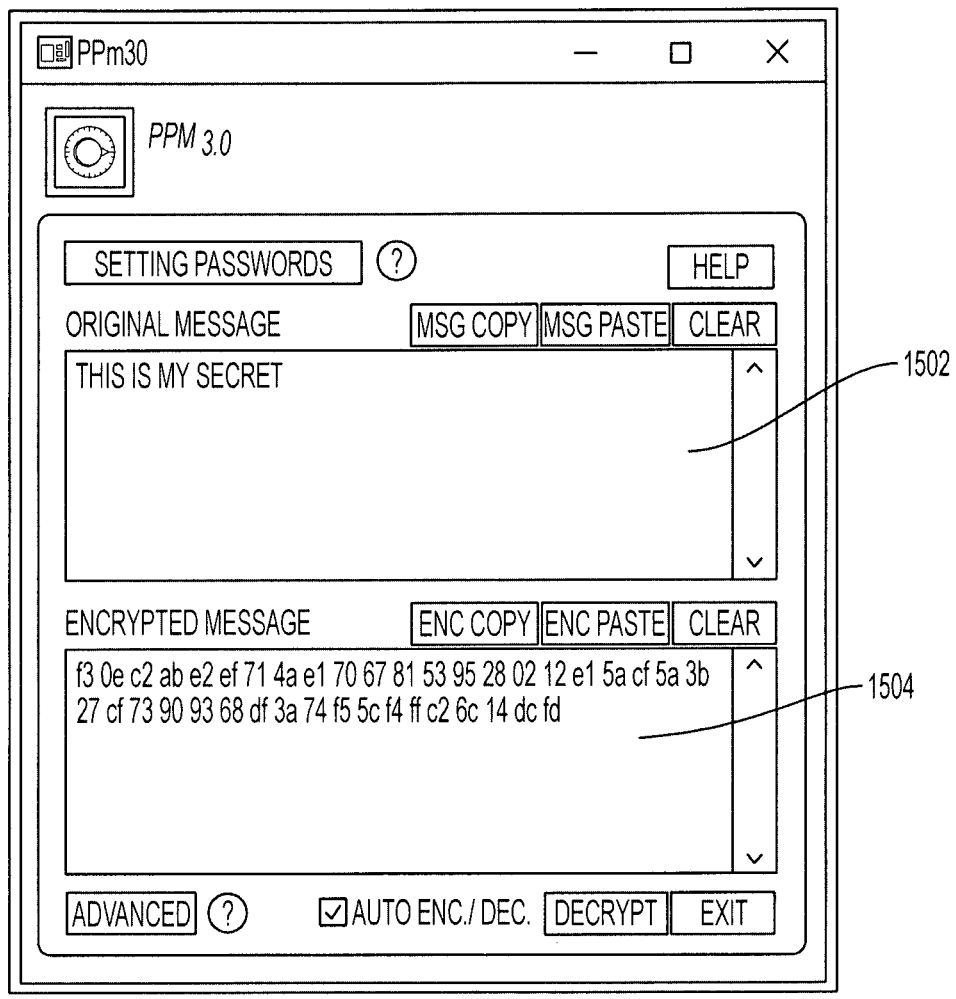
FIG. 15 shows a decryption process for use with an embodiment.

The decryption of PPM will be described with respect to FIGS. 14 and 15:

1. Hightlight and press the Control-C key on any PPM encrypted text 1402, this will send the selected text to the clipboard, 2. Press the "Enc Paste" button of PPM, the PPM will paste text from Clipboard to the Encrypted Message window 1504, 3. The text in the Encrypted Message window 1504 will also be decrypted automatically, 4. The decrypted text will appear in the Original Message window 1502.

Figure 16:
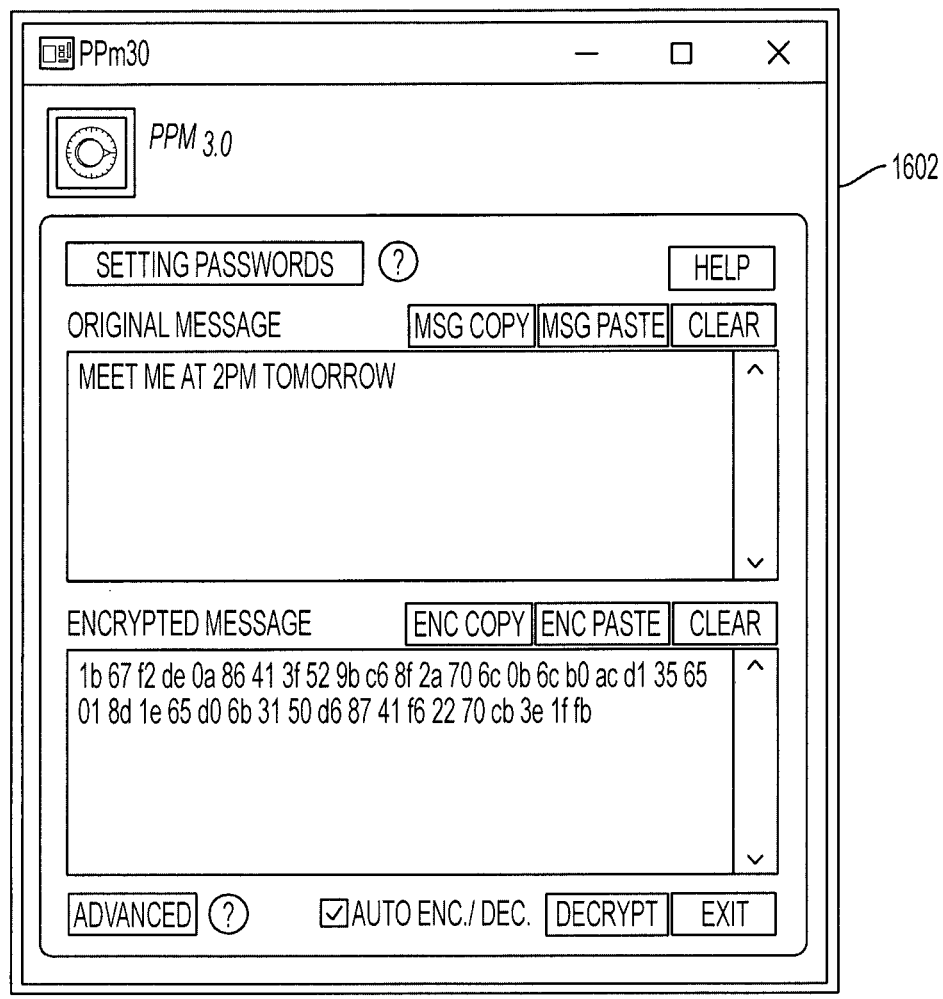
FIG. 16 shows a process of sending an encrypted message to a live chat program for use with an embodiment.
Figure 17:
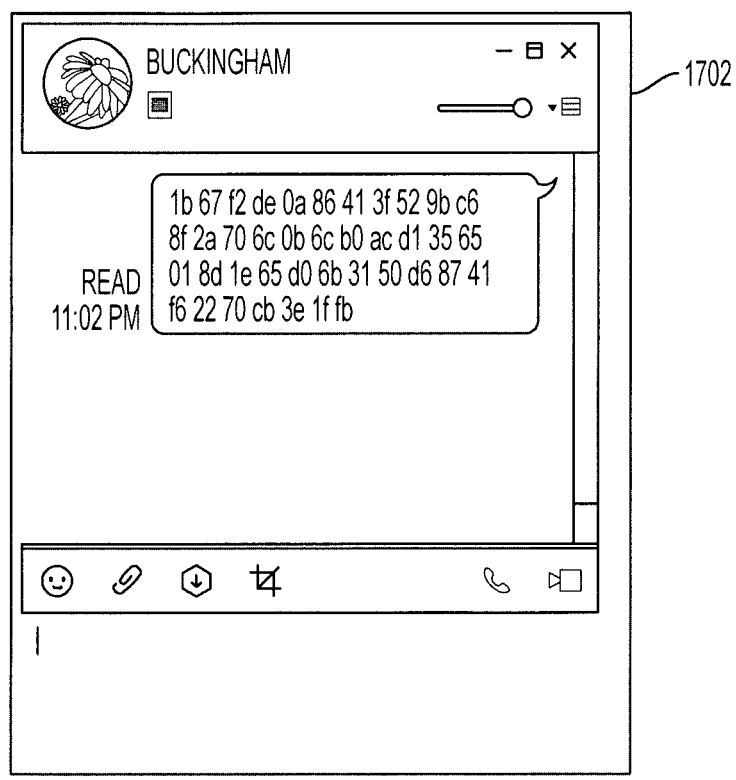
FIG. 17 shows a process of sending an encrypted message to a live chat program for use with an embodiment.

Sending an Encrypted Message to a Live Chat Program called LINE will be described with respect to FIGS. 16 and 17.

Suppose you want to perform secure live chatting with someone called "Buckingham" using a popular chat software called LINE installed on a machine. The machine also has an Encryption-Box attached. The secure live chat can be performed by the following procedures:

1. Suppose you have the PPM and the popular chat software LINE on your machine.

2. Type a message in the Original Message window 1602 such as "Meet Me At 2 pm Tomorrow" on PPM.

3. While you are typing message in the Original Message window 1602, the corresponding encrypted message "1b 67 f2 de 0a 86 41 3f 52 9b c6 8f 2a 70 6c 0b 6c b0 ac d1 35 65 01 8d 1e 65 d0 6b 31 50 d6 87 41 f6 22 70 cb 3e 1f fb"

will appear on the Encrypted Message window 1604 at the same time.

4. Press the "Enc Copy" button to send the encrypted message onto the Clipboard.

5. Paste the encrypted message on the Clipboard onto the typing area 1702 of LINE and press the return key to send the encrypted message to the chat area of LINE.

6. You will see the encrypted message appear in the chat area of LINE.

Figure 18:
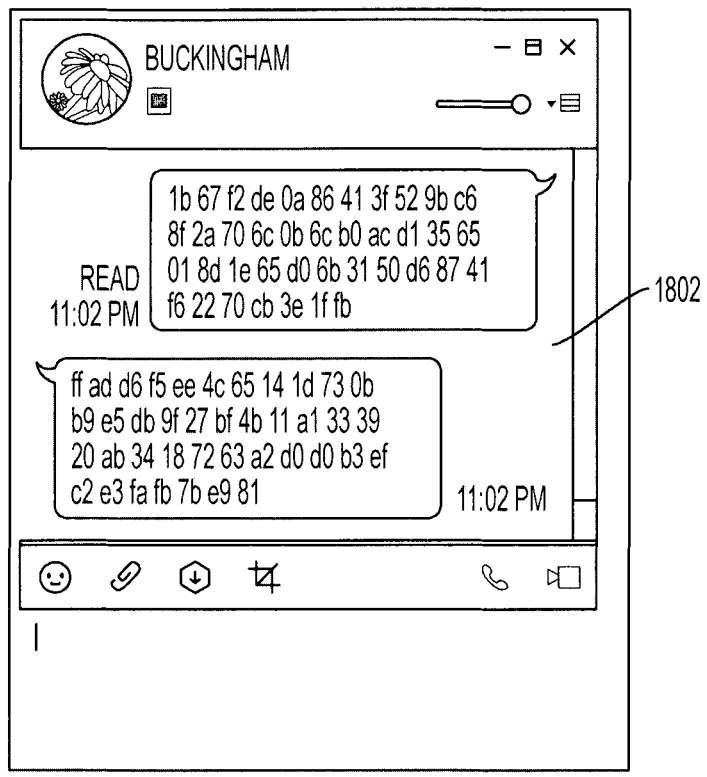
FIG. 18 shows a process of decrypting an encrypted message received from a live chat program for use with an embodiment.
Figure 19:
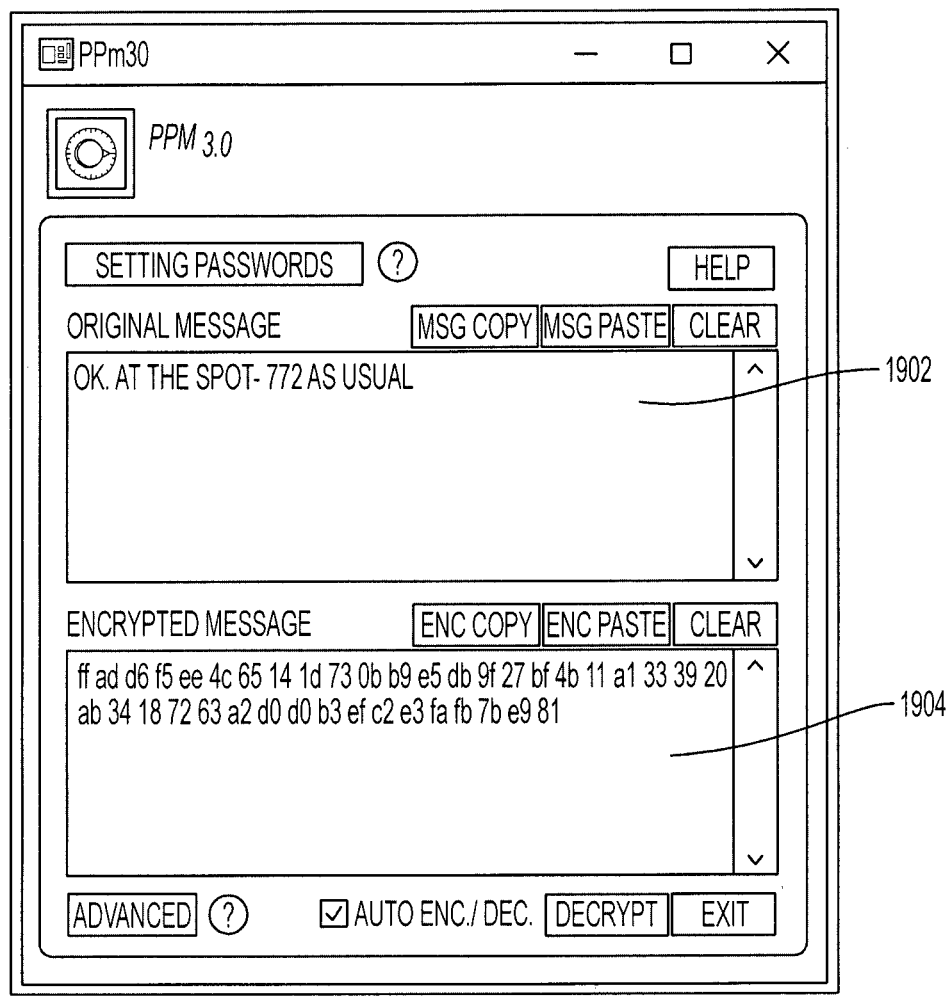
FIG. 19 shows a process of decrypting an encrypted message received from a live chat program for use with an embodiment.

Decrypting an encrypted message from a live chat program called line will be described with respect to FIGS. 18 and 19.

Suppose you have received a PPM encrypted message

"ff ad d6 f5 ee 4c 65 14 1d 73 0b b9 e5 db 9f 27 bf 4b 11 a1 33 39 20 ab 34 18 72

63 a2 d0 d0 b3 ef c2 e3 fa fb 7b e9 81"

from LINE. The following procedure can be used to decrypt it:

1. Highlight the encrypted message from the chat area 1802 of LINE.

2. Press the Control-C key to send the encrypted message to the Clipboard.

3. Press the "Enc Paste" button from PPM.

4. The encrypted message will be copied from the Clipboard to the Encrypted Message window 1904 of PPM. Also the encrypted message will be decrypted by PPM automatically at the same time.

5. The decryption results such as

"OK. At the spot-772 as usual"

will be displayed in the Original Message window 1902 of PPM. You can read the original message and do whatever you like.

Figure 20:
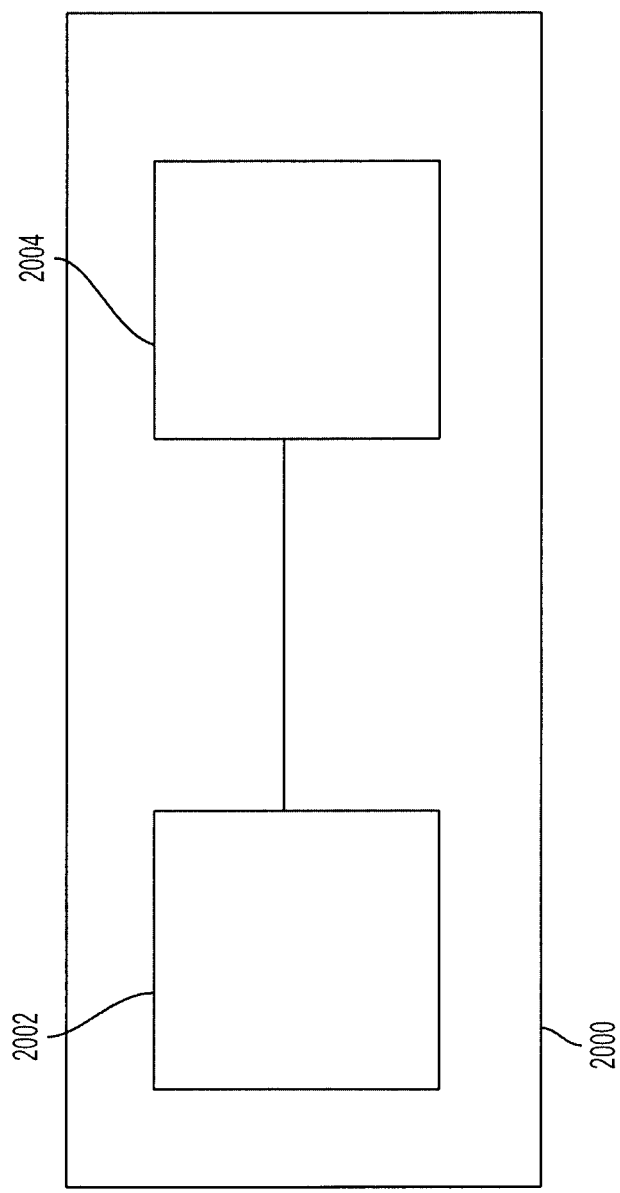
FIG. 20 shows an encryption box device according to a third embodiment.

In a third embodiment, shown in FIG. 20, an encryption box device 2000 includes a memory 2002 and a processor 2004 coupled to the memory 2002.

Figure 21:
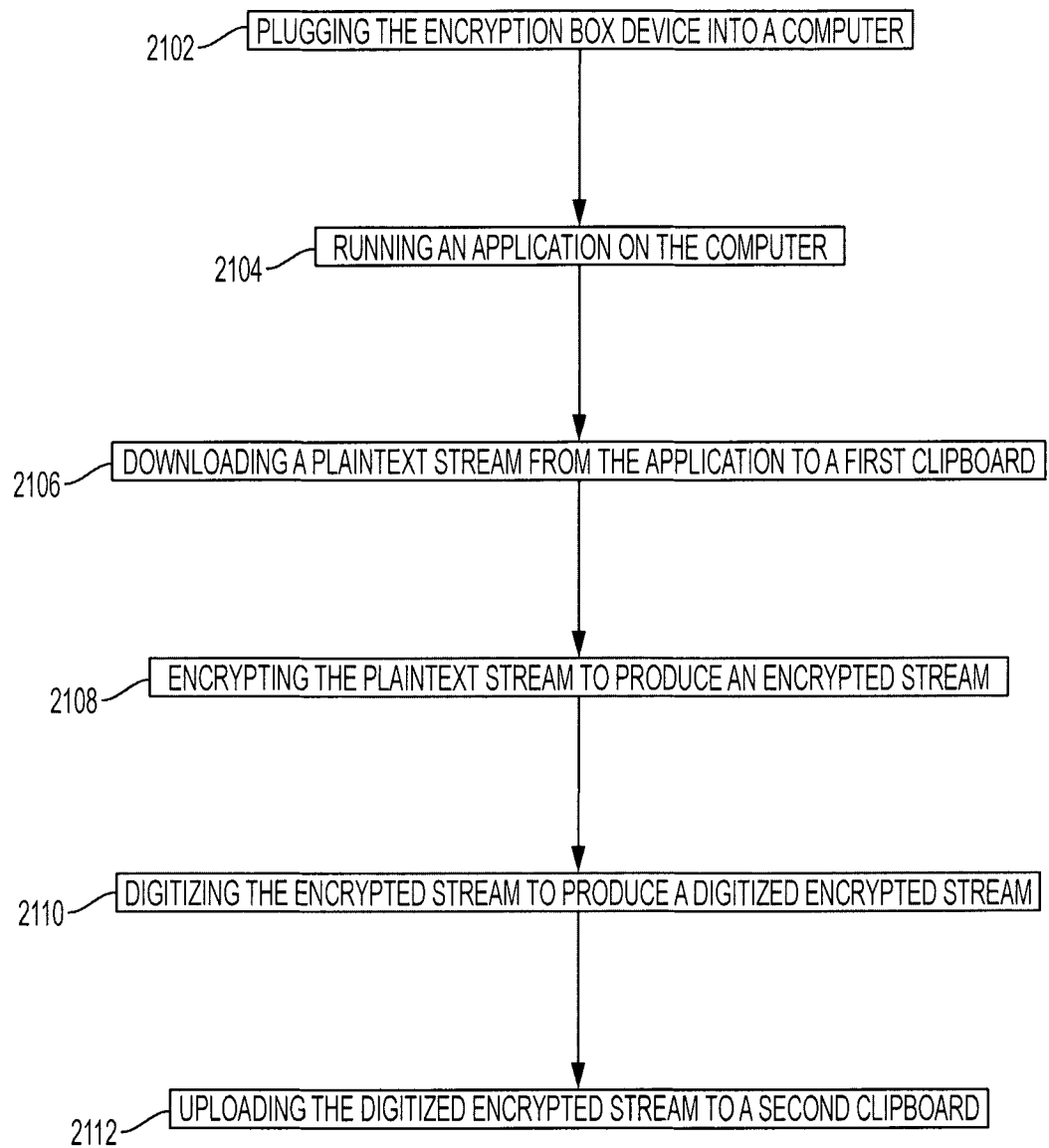
FIG. 21 shows a method of secure encryption according to a fourth embodiment.

In a fourth embodiment, shown in FIG. 21, a method of secure encryption using an encryption box device includes a first operation 2102 of plugging the encryption box device into a computer. The method of secure encryption then performs a second operation 2104 of running an application on the computer. The method of secure encryption then performs a third operation 2106 of downloading a plaintext stream from the application to a first clipboard. The method of secure encryption then performs a fourth operation 2108 of encrypting the plaintext stream to produce an encrypted stream. The method of secure encryption then performs a fifth operation 2110 of digitizing the encrypted stream to produce a digitized encrypted stream. The method of secure encryption then performs a sixth operation 2112 of uploading the digitized encrypted stream to a second clipboard.

The application may be a spreadsheet, a text window, an email, a word processor, a chat room, or a presentation.

The method of secure encryption may further include a seventh operation of digitizing the encrypted stream according to a mode such as no digitization, Base 64 digitization, hexadecimal numbers without spacing, paired hexadecimal numbers with spacing, a user-defined mode, or save as a file (flag).

The method of secure encryption may further include an eighth operation of downloading the digitized encryption stream from the second clipboard. The method of secure encryption may further include a ninth operation of de-digitizing the digitized encryption stream to produce the encrypted stream and providing the encrypted stream to the encryption engine. The method of secure encryption may further include a $10^{th}$ operation of decrypting the encrypted stream to produce the plaintext stream and uploading the plaintext stream to the first clipboard.

The method of secure encryption may further include an $11^{th}$ operation of de-digitizing the digitized encryption stream according to a mode such as no de-digitization, Base 64, hexadecimal numbers without spacing, paired hexadecimal numbers with spacing, a user-defined mode, or save as a file (flag).

The method of secure encryption may further include a 12$^{th}$ operation of simulating the encryption box device using a hardware emulator.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

What is claimed is:

1. An encryption box device comprising:
   a memory; and
   a processor coupled to the memory and configured to implement,
      a first clipboard configured to download a plaintext stream in a first format from an application of a computer;
      an encryption engine configured to receive the plaintext stream and encrypt the plaintext stream to produce an encrypted stream;
      a digitizer configured to digitize the encrypted stream according to a mode to produce a digitized form of the encrypted stream,
         the digitized form of the encrypted stream being in a second format according to the mode which is compatible with the computer to be displayed by the application of the computer; and
      a second clipboard configured to upload the digitized form of the encrypted stream in the second format to a location at the application,
      wherein a clickable tag is installed in the application, the clickable tag when clicked provides at least one button from among buttons of an encryption button and a decryption button in the application, a selected content at the location being the plaintext stream, from the application;
      the clickable tag is configured to,
         upon pressing the encryption button, copy the selected content and send the selected content to a download clipboard of the first clipboard;
         encrypt the selected content using the encryption engine, to produce encrypted selected content;
         digitize the encrypted selected content using the digitizer, to produce encrypted and digitized selected content, the encrypted and digitized selected content is sent to an upload clipboard of the second clipboard; and
         paste the encrypted and digitized selected content to the location of the application from the second clipboard using the upload clipboard of the second clipboard;
      wherein the mode is a mode selectable from among a group of modes including,
         Base 64 digitization,
         hexadecimal numbers without spacing, and
         paired hexadecimal numbers with spacing.

2. The encryption box device of claim 1, wherein the group of modes further includes a user-defined mode.

3. The encryption box device of claim 2, wherein the processor is to further implement:
   a de-digitizer configured to download the digitized form of the encrypted stream from the second clipboard and de-digitize the digitized form of the encrypted stream in the second format to produce the encrypted stream and provide the encrypted stream to the encryption engine; and
   the encryption engine further configured to decrypt the encrypted stream to produce the plaintext stream in the first format and upload the plaintext stream to the first clipboard.

4. The encryption box device of claim 3, wherein the de-digitizer de-digitizes the digitized form of the encrypted stream to produce the encrypted stream according to the mode.

5. The encryption box device of claim 1, wherein the encryption box device comprises a dongle that is pluggable into the computer, the computer including any one of:
   a personal computer,
   a laptop,
   a smart phone,
   a tablet,
   a smart TV,
   an intelligent network drive,
   a central storage, and
   a set-top box.

6. The encryption box device of claim 1, wherein the encryption box device comprises a USB device that is pluggable into the computer, the computer including any one of:
   a personal computer,
   a laptop,
   a smart phone,
   a tablet,
   a smart TV, an intelligent network drive,
a central storage, and
a set-top box.

7. The encryption box device of claim 1, wherein the download and upload is by wireless communication including any one of Wi-Fi and Bluetooth.

8. The encryption box device of claim 1, further comprising a proprietary wireless communication interface and a plurality of wireless adapters pluggable into the computer, the computer including any one of:
a personal computer,
a laptop,
a smart phone,
a tablet,
a smart TV,
an intelligent network drive,
a central storage, and
a set-top box.

9. The encryption box device of claim 8, wherein the processor is configured to limit use of the encryption box device to a user of one of the plurality of wireless adapters.

10. The encryption box device of claim 1, wherein the processor is configured to simulate use of the encryption box device by a hardware emulator.

11. The encryption box device of claim 10, wherein the encryption box device is simulated in a mobile phone, an ISDN phone, a smart TV, an Intelligent Network Drive, central storage, a smart phone, a display screen, a telephone exchange, a tablet, the computer, a radio, a cloud platform, or in a communication platform.

12. The encryption box device of claim 1, wherein the group of modes further includes save as file mode with an option of a set flag, and/or the first format is a format corresponding to an application from among applications including:
a spreadsheet,
a text window,
an email,
a word processor,
a chat room,
file browser, and
a presentation.

13. The encryption box device of claim 1, wherein,
the first clipboard comprises an upload clipboard and a download clipboard, the first clipboard running on the processor to download the plaintext stream in the first format from the application to the download clipboard of the first clipboard;
the second clipboard comprises an upload clipboard and a download clipboard, the second clipboard running on the processor to upload the digitized form of the encrypted stream using the upload clipboard of the second clipboard.

14. The encryption box device of claim 13, wherein the application is a spreadsheet application and the location from the application includes a cell in a spreadsheet of the spreadsheet application.

15. A method of secure encryption by an encryption box device pluggable into a computer, the method comprising:
by a processor coupled to a memory,
downloading a plaintext stream in a first format from an application running on the computer to a first clipboard;
encrypting the plaintext stream to produce an encrypted stream;
digitizing the encrypted stream according to a mode to produce a digitized form of the encrypted stream, the digitized form of the encrypted stream being in a second format according to the mode which is compatible with the computer to be displayed by the application of the computer; and
uploading, by a second clipboard, the digitized form of the encrypted stream in the second format to a location at the application,
wherein a clickable tag is installed in the application, the clickable tag when clicked provides at least one button from among buttons of an encryption button and a decryption button in the application, a selected content at the location being the plaintext stream, from the application;
the clickable tag is configured to,
upon pressing the encryption button, copy the selected content and send the selected content to a download clipboard of the first clipboard;
encrypt the selected content, to produce encrypted selected content;
digitize the encrypted selected content using a digitizer, to produce encrypted and digitized selected content, the encrypted and digitized selected content is sent to an upload clipboard of the second clipboard; and
paste the encrypted and digitized selected content to the location of the application from the second clipboard using the upload clipboard of the second clipboard,
wherein the mode is a mode selectable from among a group of modes including,
Base 64 digitization,
hexadecimal numbers without spacing,
paired hexadecimal numbers with spacing, and
a user-defined mode.

16. The method of secure encryption of claim 15, wherein the first format is a format corresponding to an application from among applications including:
a spreadsheet,
a text window,
an email,
a word processor,
a chat room,
file browser, and
a presentation.

17. The method of secure encryption of claim 15, wherein the group of modes further includes
a user-defined mode.

18. The method of secure encryption of claim 17, further comprising:
by the processor,
downloading the digitized form of the encrypted stream from the second clipboard and de-digitizing the digitized form of the encrypted stream in the second format according to the mode to produce the encrypted stream; and
decrypting the encrypted stream to produce the plaintext stream in the first format and uploading the plaintext stream to the first clipboard.

19. The method of secure encryption of claim 18, wherein the de-digitizing to produce the encrypted stream is according to the mode.

20. The method of secure encryption of claim 15, further comprising simulating the encryption box device using a hardware emulator in the computer.

21. An encryption box device comprising:
a memory; and
a processor coupled to the memory and configured to implement, a first clipboard configured to download a plaintext stream in a first format from a file on a computer;
an encryption engine configured to receive the plaintext stream and encrypt the plaintext stream to produce an encrypted stream;
a digitizer configured to digitize the encrypted stream according to a mode to produce a digitized form of the encrypted stream,
the digitized form of the encrypted stream being in a second format according to the mode which is compatible with the computer to be saved digitally by the computer, and
a second clipboard configured to upload the digitized form of the encrypted stream in the second format to a location on the computer and/or Cloud,
wherein the mode is a mode selectable from among a group of modes including,
Base 64 digitization,
hexadecimal numbers without spacing, and
paired hexadecimal numbers with spacing.

22. A method of secure encryption by an encryption box device pluggable into a computer, the method comprising: by a processor coupled to a memory,
downloading a plaintext stream in a first format from a file running on the computer to a first clipboard;
encrypting the plaintext stream to produce an encrypted stream;
digitizing the encrypted stream according to a mode to produce a digitized form of the encrypted stream,
the digitized form of the encrypted stream being in a second format according to the mode which is compatible with the computer to be saved digitally by the computer; and
uploading, by a second clipboard, the digitized form of the encrypted stream in the second format to a location on the computer and/or Cloud,
wherein the mode is a mode selectable from among a group of modes including,
Base 64 digitization,
hexadecimal numbers without spacing, and
paired hexadecimal numbers with spacing.

\* \* \* \* \*